US009506462B2

(12) United States Patent
Oba et al.

(10) Patent No.: US 9,506,462 B2
(45) Date of Patent: Nov. 29, 2016

(54) COMPRESSION APPARATUS AND COOLER UNIT WITH SUPPORT STRUCTURE FOR COOLER UNIT

(71) Applicant: Kobe Steel, Ltd., Hyogo (JP)

(72) Inventors: Sho Oba, Hyogo (JP); Emi Ogawa, Hyogo (JP); Ryusuke Igaki, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 59 days.

(21) Appl. No.: 14/285,677

(22) Filed: May 23, 2014

(65) Prior Publication Data

US 2015/0000867 A1    Jan. 1, 2015

(30) Foreign Application Priority Data

Jun. 28, 2013  (JP) ................. 2013-136474

(51) Int. Cl.
| | |
|---|---|
| *F25D 9/00* | (2006.01) |
| *F04B 39/06* | (2006.01) |
| *F25B 31/00* | (2006.01) |
| *F04B 41/00* | (2006.01) |
| *F02C 7/141* | (2006.01) |
| *F02C 7/143* | (2006.01) |
| *F02C 7/18* | (2006.01) |

(52) U.S. Cl.
CPC ............. *F04B 39/06* (2013.01); *F04B 41/00* (2013.01); *F25B 31/00* (2013.01); *F02C 7/141* (2013.01); *F02C 7/143* (2013.01); *F02C 7/185* (2013.01); *F25B 2400/072* (2013.01)

(58) Field of Classification Search
CPC .. F25B 31/00; F25B 2400/072; F02C 7/141; F02C 7/143; F02C 7/185; F04B 39/06; F04B 41/00

USPC ............... 62/172, 401; 417/423.14
See application file for complete search history.

(56) References Cited

U.S. PATENT DOCUMENTS

| | | | | |
|---|---|---|---|---|
| 4,325,486 | A * | 4/1982 | Neal | A47B 81/04 |
| | | | | 211/113 |
| 7,975,505 | B2 * | 7/2011 | Struck | F01D 15/005 |
| | | | | 417/423.14 |
| 2008/0112825 | A1 | 5/2008 | Struck | |
| 2009/0071921 | A1 * | 3/2009 | Harwin | A47B 73/00 |
| | | | | 211/74 |

FOREIGN PATENT DOCUMENTS

| | | |
|---|---|---|
| JP | 2585299 B2 | 11/1996 |
| JP | 2000-015005 A | 1/2000 |
| JP | 2007-040158 A | 2/2007 |
| JP | 2008-121669 A | 5/2008 |
| JP | 2011-052717 A | 3/2011 |

* cited by examiner

*Primary Examiner* — Marc Norman
*Assistant Examiner* — David Teitelbaum
(74) *Attorney, Agent, or Firm* — Studebaker & Brackett PC (57) ABSTRACT

The present invention provides a compression apparatus capable of improving assembling workability, and the compression apparatus includes: a compressor that compresses a gas; a cooler that cools a gas discharged from the compressor in a compressed state; and a support base that supports the compressor and the cooler, wherein the support base includes a main support base having the compressor disposed thereon and an auxiliary support table connectable to the main support base, and wherein the auxiliary support table includes a base plate supporting the cooler and a plurality of leg portions supporting the base plate and stands by itself by the plurality of leg portions.

7 Claims, 8 Drawing Sheets

COMPRESSION APPARATUS AND COOLER UNIT WITH SUPPORT STRUCTURE FOR COOLER UNIT

BACKGROUND OF THE INVENTION

Field of the Invention

The present invention relates to a compression apparatus that compresses a gas.

Description of the Related Art

Figure 10:
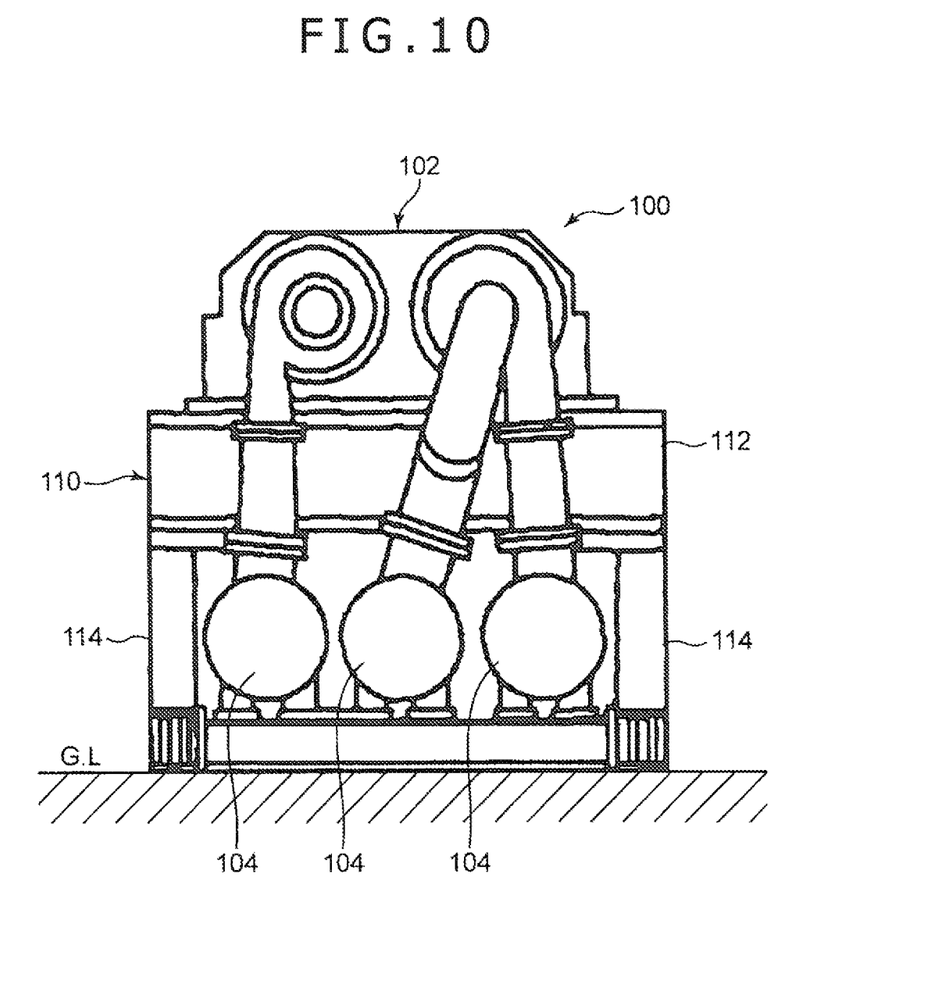
FIG. 10 is a front view of a multi-axis centrifugal air compressor of the related art.

As illustrated in FIG. 10, Japanese Patent No. 2585299 discloses a multi-axis centrifugal air compressor 100. In the multi-axis centrifugal air compressor 100, a multi-axis centrifugal compressor body 102 that increases the pressure of air in three stages or four stages and three an coolers 104 that cool the compressed air in the respective pressure stages discharged from the multi-axis centrifugal compressor body 102 are supported by a support base 110. The support base 110 includes a box-shaped compressor base 112 that is widened in the horizontal direction and four skid base leg portions 114 that support the box-shaped compressor base 112 extending downward from four corners of the box-shaped compressor base 112 at a predetermined height position. Then, the multi-axis centrifugal compressor body 102 is disposed on the box-shaped compressor base 112, and three air coolers 104 are disposed below the box-shaped compressor base 112. In this way, the multi axis centrifugal compressor body 102 and three an coolers 104 are disposed at the upper and lower positions with the box-shaped compressor base 112 interposed therebetween. Accordingly, the installation space may be saved.

SUMMARY OF THE INVENTION

Incidentally, when the number of the compressor bodies increases, the number of the coolers also increases, and hence the entire compression apparatus increases in size. In the configuration of the related art, since the base is provided by assembling iron frames in the installation place or the cooler is disposed on the base, the work load increases.

Therefore, the present invention is made in view of the above-described circumstance, and a main object thereof is to improve the assembling workability of a compression apparatus.

In order to solve the above-described problems, according to an aspect of the present invention, there is provided a compression apparatus including: a compressor that compresses a gas; a cooler that cools a gas discharged from the compressor in a compressed state; and a support base that supports the compressor and the cooler, wherein the support base includes a main support base having the compressor disposed thereon and an auxiliary support table connectable to the main support base, and wherein the auxiliary support table includes a base plate supporting the cooler and a plurality of leg portions supporting the base plate and stands by itself by the plurality of leg portions.

In the present invention, since the auxiliary support table may stand by itself, there is no need to support the auxiliary support table in a work in which the auxiliary support table is connected to the main support base. Further, since the auxiliary support table may stand by itself even in a state where the cooler is attached thereto, the cooler may be easily transported while the cooler is attached thereto. Accordingly, the cooler disposed on the auxiliary support table in a factory or the like may be moved to an installation place, and the auxiliary support table having the cooler disposed thereon may be easily and directly connected to the main support base. As a result, it is possible to improve the assembling workability of the compression apparatus in the installation place.

The cooler may be disposed at the lower side of the base plate, and the plurality of leg portions may be disposed so that at least two leg portions are located at both sides of the arrangement position of the cooler with a gap interposed therebetween.

In this aspect, the auxiliary support table may stand by itself through a simple configuration in which the base plate is supported by the plurality of leg portions provided at both sides of the arrangement position of the cooler.

The auxiliary support table may include a suspending portion that suspends the cooler on the base plate. In this case, the suspending portion may include a variation allowing portion that allows the movement of the cooler from the arrangement position with an expansion of a pipe connecting the compressor and the cooler to each other.

According to such a configuration, when the pipe connecting the compressor and the gas cooler to each other is thermally expanded by the high-temperature gas discharged from the compressor, the cooler moves, and hence the stress caused be the thermal expansion may be suppressed.

The auxiliary support table may further include a cross beam member that is stretched between the leg portions below the arrangement position of the cooler. In this case, the cross beam member may include a first swing limiting portion that restricts the movement of the cooler in a direction intersecting the cross beam member.

According to such a configuration, since the cross beam member is provided, the swing of the cooler in a direction intersecting the cross beam member may be suppressed by using the cross beam member while improving the rigidity of the auxiliary support table.

The cross beam member may include a second swing limiting portion that restricts the movement of the cooler in a direction along the cross beam member.

According to such a configuration, since the cross beam member is provided, the swing of the cooler in a direction along the cross beam member may be suppressed by using the cross beam member while improving the rigidity of the auxiliary support table.

According to another aspect of the present invention, there is provided a cooler unit that includes a compressor compressing a gas and a main support base having the compressor disposed thereon and is connectable to a compression apparatus body the cooler unit including: a cooler that cools the gas discharged from the compressor in a compressed state; and an auxiliary support table that supports the cooler and is connectable to the main support base, wherein the auxiliary support table includes a base plate, a plurality of leg portions that support the base plate, a suspending portion that suspends the cooler on the base plate, a cross beam member that is stretched between the leg portions below the arrangement position of the cooler, and a fixation portion that fixes the cooler suspended on the suspending portion to the cross beam member.

In the present invention, since the auxiliary support table may stand by itself, there is no need to support the auxiliary support table in a work in which the auxiliary support table is connected to the main support base. Further, since the auxiliary support table may stand by itself even in a state where the cooler is attached thereto, the cooler may be easily transported while the cooler is attached thereto. Accordingly, the cooler disposed on the auxiliary support table in a factory or the like may be moved to an installation place, and the auxiliary support table having the cooler disposed thereon may be easily and directly connected to the main support base. As a result, it is possible to improve the assembling workability when the compression apparatus is assembled by connecting the cooler unit to the compression apparatus body.

The fixation portion may be adapted to release the fixed state of the cooler and may serve as swing limiting portion that restricts the movement of the cooler in a direction intersecting the cross beam member in the released state.

According to such a configuration, since the cross beam member is provided, the swing of the cooler in a direction intersecting the cross beam member may be suppressed by using the cross beam member while improving the rigidity of the auxiliary support table.

As described above, according to the present invention, the assembling workability of the compression apparatus may be improved.

BRIEF DESCRIPTION OF THE DRAWINGS

FIGS. 6A and 6B are views illustrating a swing limiting portion of a first cross beam member and a peripheral part thereof, where FIG. 6A is a partially enlarged front view and FIG. 6B is a cross-sectional view taken along the position VIB-VIB of FIG. 6A.

FIGS. 7A and 7B are views illustrating the swing limiting portion and the peripheral part thereof during the transportation of the first auxiliary support table, where FIG. 7A is a partially enlarged front view and FIG. 7B is a cross-sectional view taken along the position VIIB-VIIB of FIG. 7A.

DESCRIPTION OF THE PREFERRED EMBODIMENTS

Hereinafter, an embodiment of the present invention will be described by referring to the accompanying drawings.

Figure 1:
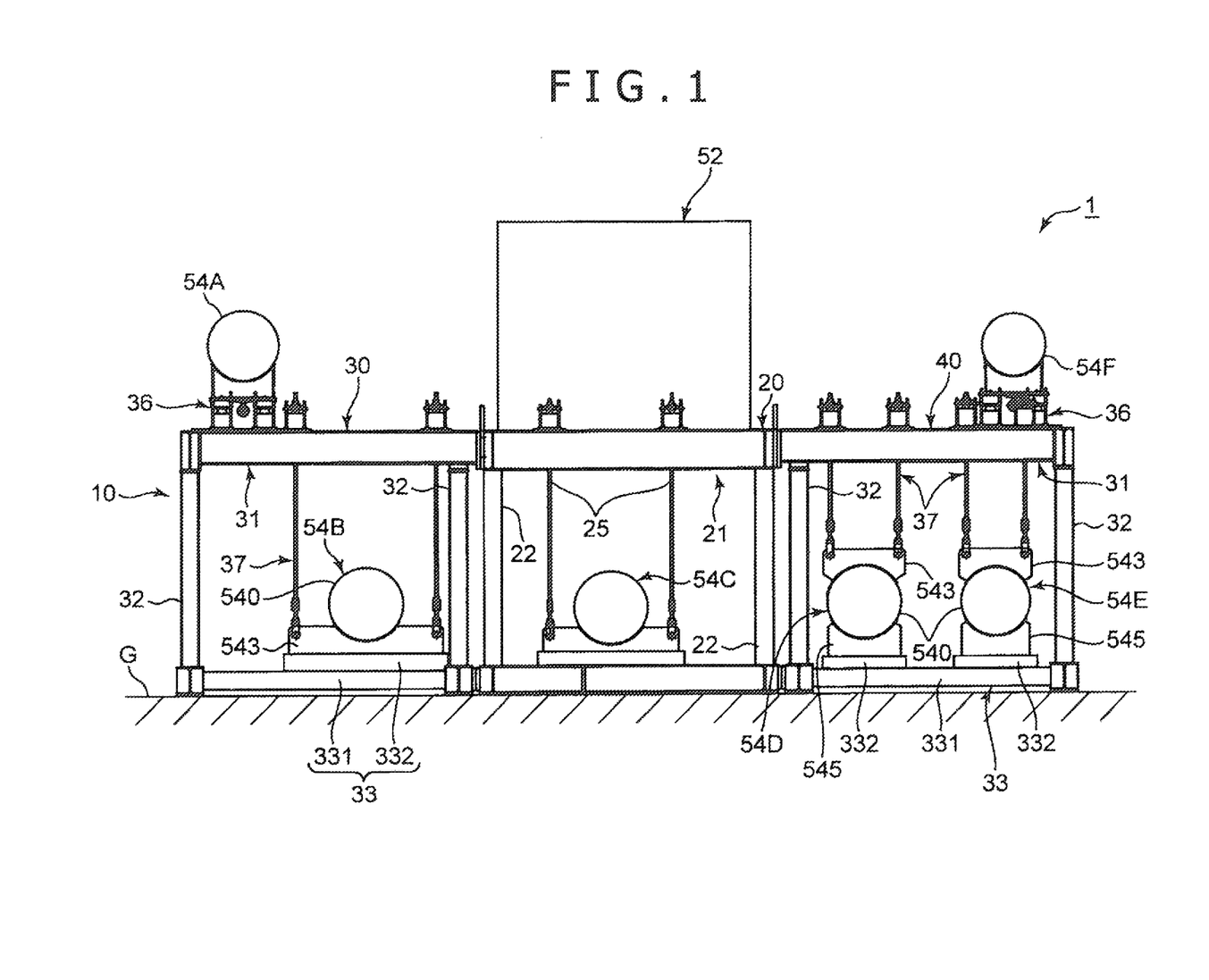
FIG. 1 is a front view illustrating a compression apparatus according to this embodiment.

As illustrated in FIG. 1, a compression apparatus 1 of this embodiment includes a compressor 52, a plurality of coolers 54A to 54F, and a support base 10 that supports the compressor 52 and the plurality of coolers 54A to 54F on an installation surface G. Furthermore, a pipe between the compressor 52 and the coolers 54A to 54F is not illustrated in the drawings. The support base 10 includes a main support base 20, a first auxiliary support table 30, and a second auxiliary support table 40. In the support base 10 of this embodiment, the first auxiliary support table 30 and the second auxiliary support table 40 are disposed at both sides of the main support base 20 with the main support base 20 interposed therebetween in the horizontal direction.

The compression apparatus 1 of this embodiment includes six coolers, the first to sixth coolers 54A to 54F. In FIG. 1, the left upper-stage cooler is set as the first cooler 54A, the lower-stage coolers are set as the second to fifth coolers 54B to 54E in this order from the left side, and the right upper-stage cooler is set as the sixth cooler 54F. In this embodiment, the main support base 20 and the compressor 52 disposed thereon constitute a main body of the compression apparatus 1. Further, in the description below, there is a case where the first auxiliary support table 30 on which the second cooler 54B is disposed is referred to as a first cooler unit and the second auxiliary support table 40 on which the fourth cooler 54D and the fifth cooler 54E are disposed are referred to as a second cooler unit.

Figure 2:
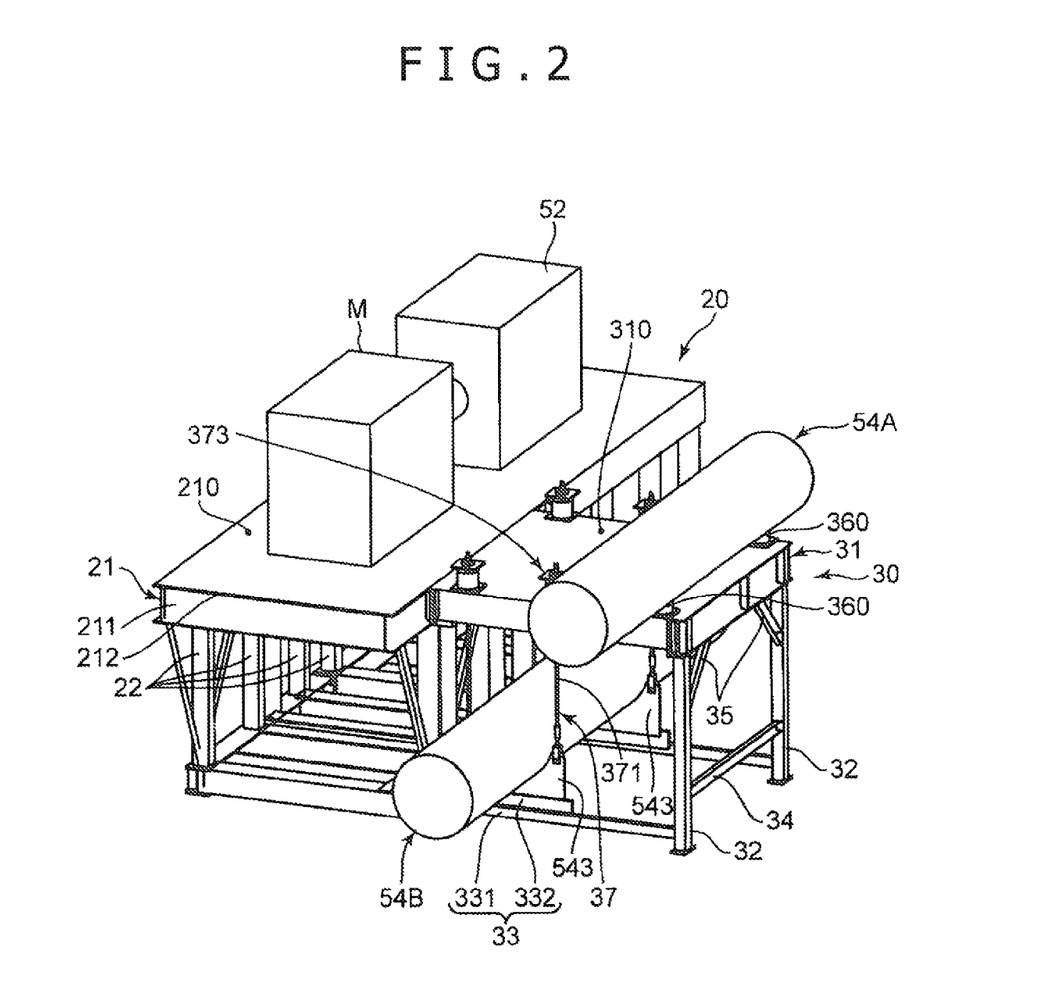
FIG. 2 is an enlarged perspective view when obliquely viewed from the upper and rear sides of a first auxiliary support table and a main support base of a support base.

The compressor 52 is a so-called multi-stage compressor that gradually increases the pressure of a gas to a predetermined pressure. As illustrated in FIG. 2, the compressor 52 is driven by the rotation power generated from a motor M connected to the compressor 52.

Each of the first to sixth coolers 54A to 54F includes a columnar cooler body 540 that extends in the horizontal direction. The first to sixth coolers 54A to 54F are respectively disposed on the support base 10 so that the center axes (hereinafter, simply referred to as the "cooler axes") of the cooler bodies 540 are parallel to one another. Each cooler body 540 cools a gas introduced thereinto and discharges the gas cooled therein. Each of the second to fifth coolers 54B to 54E includes a pair of support pieces 543 which is disposed in parallel in a direction perpendicular to the drawing paper of FIG. 1. The support pieces 543 are respectively provided at both ends of the cooler body 540 in the cooler axis direction.

As illustrated in FIG. 2, the main support base 20 includes a main body base plate 21 and a plurality of main body leg portions 22. The main support base 20 supports the compressor 52 and the third cooler 54C on the installation surface G. The main support base 20 of this embodiment also supports the motor M as a drive source of the compressor 52.

The main body base plate 21 is a part that includes a placement surface 210 formed at the upper end thereof so as to be widened in the horizontal direction. Specifically, the main body base plate 21 has a rectangular shape in the top view, and is formed so that an iron plate 212 or the like is placed on a frame 211 formed of shaped steel such as channel steel or H-shaped steel. As illustrated in FIG. 1, the compressor 52 is placed on the main body base plate 21, and the third cooler 54C is disposed below the main body base plate 21. The third cooler 54C is suspended from the main body base plate 21 by a swing member 25 extending in the up and down direction.

The main body leg portions 22 extend downward from the main body base plate 21, and support the main body base plate 21 so that the main body base plate 21 is located a predetermined height position on the installation surface G. For example, the main support base 20 of this embodiment includes eight main body leg portions 22 including four main body leg portions 22 disposed at four corners. These eight main body leg portions 22 are disposed so that four main body leg portions are disposed at each of both sides of the main body base plate 21 in the horizontal direction perpendicular to the cooler axis.

Figure 3:
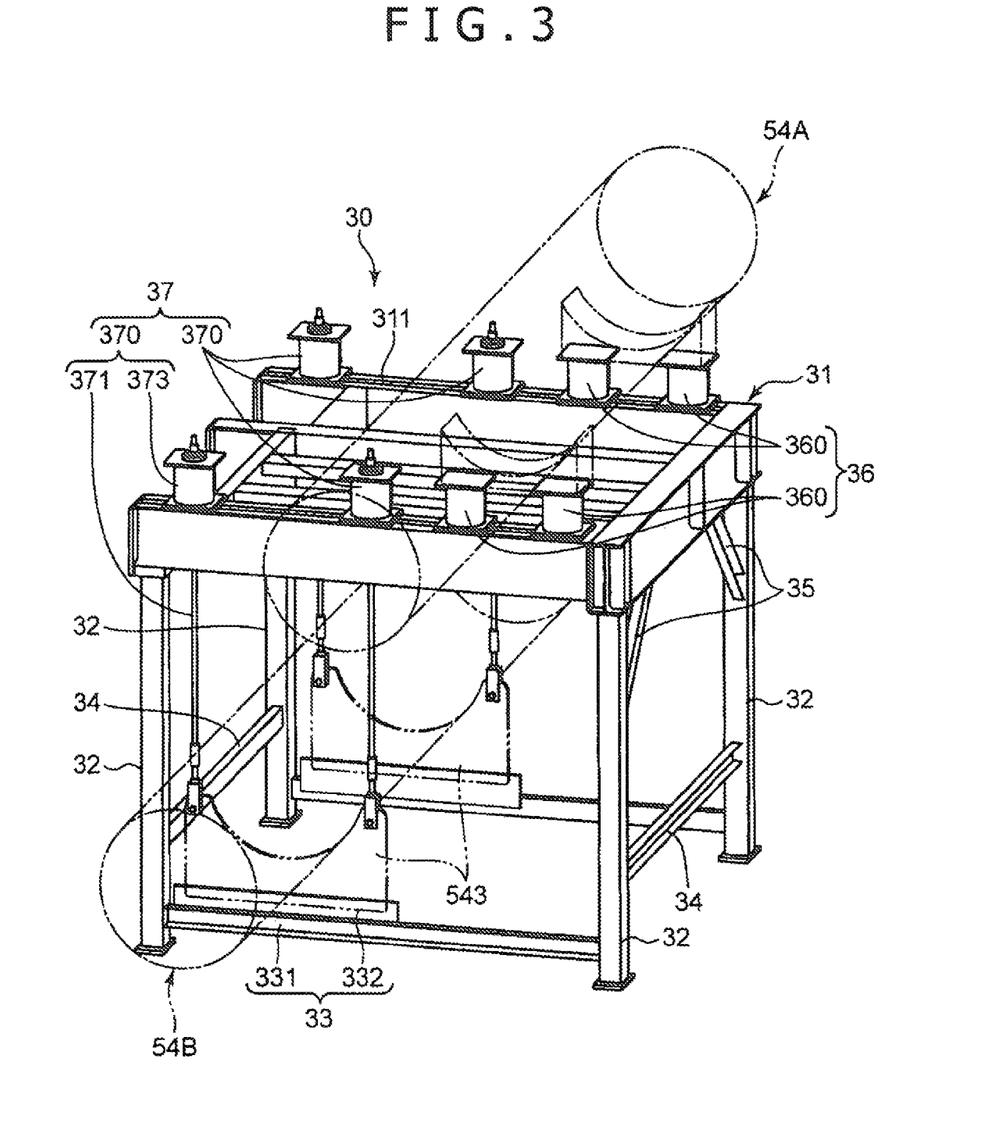
FIG. 3 is a perspective view illustrating the first auxiliary support table when obliquely viewed from the upper and rear sides thereof.

As illustrated in FIGS. 1 and 3, the first auxiliary support table 30 includes a base plate 31, a plurality of leg portions 32, a first cooler support portion 36, and a second cooler support portion (a suspending portion) 37. The first auxiliary support table 30 supports the first and second coolers 54A and 54B while being connected to the main support base 20.

The base plate 31 is a part that includes a placement surface 310 formed at the upper end thereof so as to be widened in the horizontal direction. The base plate 31 has the same configuration as that of the main body base plate 21. That is, the base plate 31 has a rectangular shape in the top view, and is formed so that an iron plate 312 or the like is placed on a frame 311 formed of shaped steel such as channel steel or H-shaped steel. The first cooler 54A is placed on the base plate 31, and the second cooler 54B is disposed below the base plate 31.

Furthermore, in FIG. 3, the iron plate 312 illustrated in FIG. 2 is omitted so as to illustrate the configuration of the frame 311. Further, each of the number of the coolers placed on the base plate 31 and the number of the coolers disposed below the base plate 31 may be two or more. Further, the cooler may be disposed at only one of a position on the base plate 31 and a position below the base plate 31. Further, the base plate 31 may have a shape other than the rectangular shape in the top view.

The leg portions 32 extend downward from the base plate 31, and support the base plate 31 so that the base plate 31 is located at a predetermined height position on the installation surface G. Specifically, the first auxiliary support table 30 includes, for example, four leg portions 32. Then, the leg portions 32 respectively extend downward from four corners of the base plate 31, and support the base plate 31 at a height position where the placement surface 310 of the base plate 31 and the placement surface 210 of the main body base plate 21 are flush with each other. In this way, the first auxiliary support table 30 realizes a self-standing configuration by a simple configuration in which the base plate 31 is supported by the plurality of leg portions 32 extending in the up and down direction.

Figure 4:
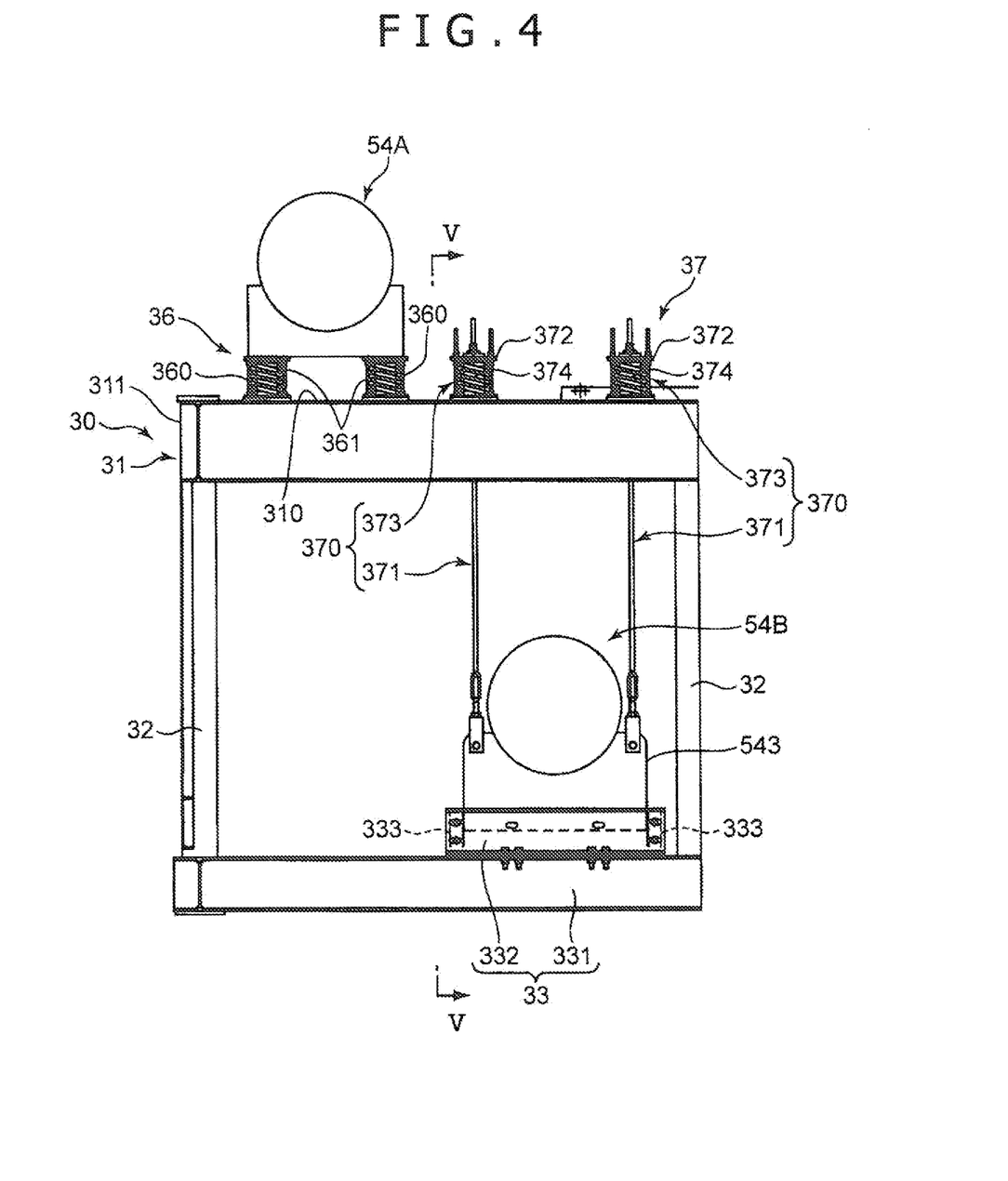
FIG. 4 is a front view of the first auxiliary support table.

As illustrated in FIG. 4, the first cooler support portion 36 includes a plurality of first support bodies 360 disposed on the base plate 31, and supports the first cooler 54A from the downside by the plurality of first support bodies 360. The first cooler support portion 36 of this embodiment supports the first cooler 54A on the placement surface 310 by four first support bodies 360. Each of the first support bodies 360 includes a spring coil 361 having a posture in which the coil axis faces the up and down direction. Then, the first support bodies 360 support the first cooler 54A by using the elastic force of the spring coil 361 disposed between the first cooler 54A and the placement surface 310. Accordingly, it is possible to absorb the thermal expansion displacement generated in a pipe (not illustrated) between the compressor 52 and the first cooler 54A caused by the high-temperature gas (the compressed high-temperature gas) discharged from the compressor 52 flowing through the pipe. As a result, it is possible to suppress the generation of stress in a pipe or the like caused by the thermal expansion. The same applies to the sixth cooler 54F of FIG. 1.

Figure 5:
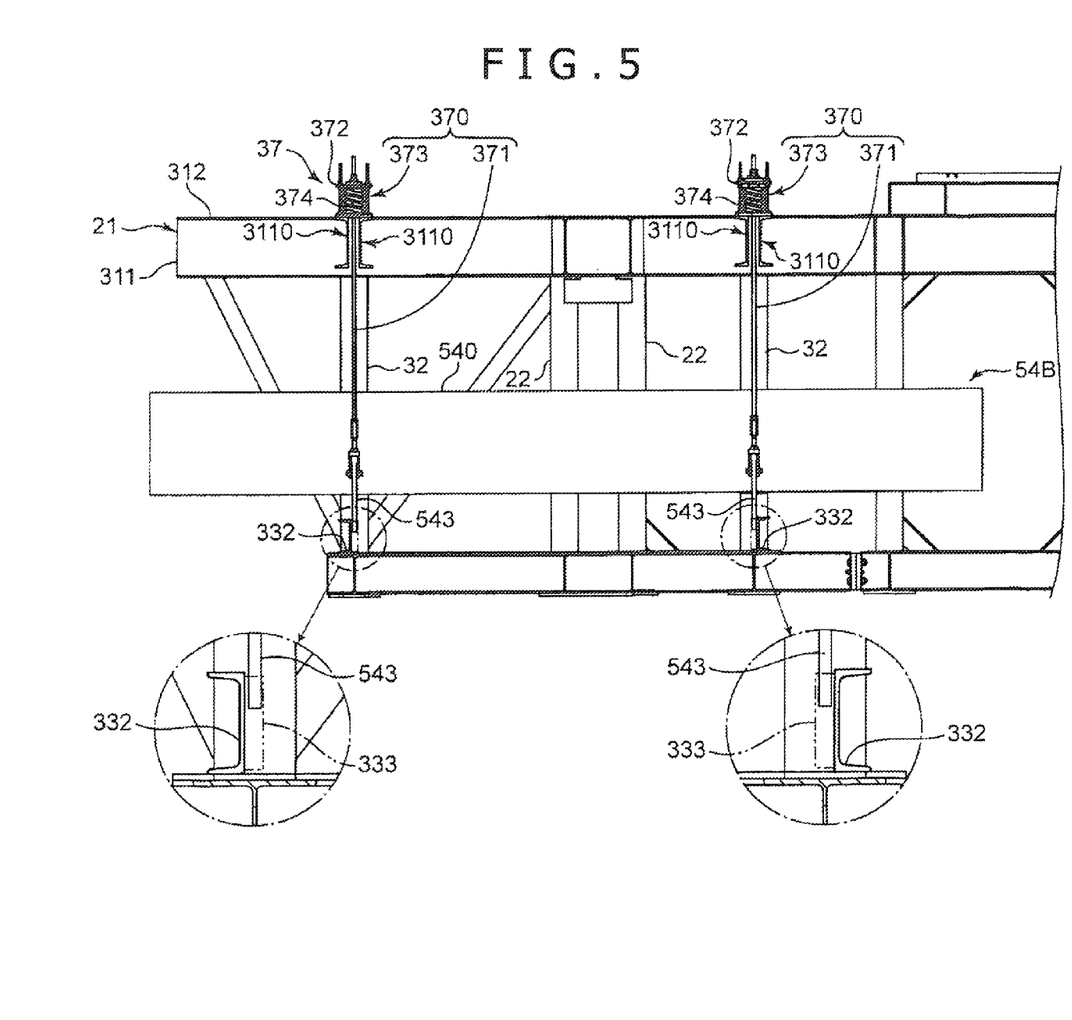
FIG. 5 is a cross-sectional view of the rear part of the first auxiliary support table at the position V-V of FIG. 4.

As illustrated in FIGS. 4 and 5, the second cooler support portion 37 includes a plurality of second support bodies 370 each of which includes a suspending portion 371 and a support portion (a variation allowing portion) 373, and suspends the second cooler 54B on the first auxiliary support table 30 by the plurality of second support bodies 370 in a swingable manner. In the first auxiliary support table 30 of this embodiment, the second cooler 54B is suspended on the base plate 314 by the second support bodies 370.

The suspending portion 371 is a member that extends from the support portion 373 disposed in the base plate 31 to the second cooler 54B disposed below the base plate 31 in the up and down direction. Specifically, the suspending portion 371 includes a flange portion 372 formed at the upper end thereof so as to be widened in the horizontal direction. Then, the upper end (the part provided with the flange portion 372) of the suspending portion 371 is supported by the support portion 373 disposed on the placement surface 310, and the suspending portion 371 is suspended downward so as to pass between a pair of channel steel members 3110 that forms the frame 311 of the base plate 31 from the upper end thereof and is disposed with a gap therebetween in the horizontal direction. The lower end of the suspending portion 371 is connected to the support piece 543 of the second cooler 54B. The suspending portion 371 of this embodiment is formed of, for example, a steel bar.

The support portion 373 includes a spring coil 374 that is disposed on the placement surface 310 of the base plate 31 and has a posture in which the coil axis faces the up and down direction. The spring coil 374 is disposed so as to be interposed between the placement surface 310 and the flange portion 372 while the suspending portion 371 is inserted along the coil axis. Then, the support portion 373 supports the second cooler 54B by using the elastic force of the spring coil 374. Accordingly, it is possible to absorb the thermal expansion displacement generated in a pipe (not illustrated) between the compressor 52 and the second cooler 54B caused by the high-temperature gas (the compressed high-temperature gas) discharged from the compressor 52 flowing through the pipe. As a result, it is possible to suppress the generation of stress in a pipe or the like caused by the thermal expansion. The same applies to the third to fifth coolers 54C to 54E.

As illustrated in FIG. 3, in the first auxiliary support table 30, a first cross beam member (the cross beam member) 33 and a second cross beam member 34 are attached to the lower portion of the leg portion 32, and a reinforcement member 35 is attached to the upper portion of the leg portion 32. Since the first and second cross beam members 33 and 34 and the reinforcement member 35 are provided in the first auxiliary support table 30, the rigidity of the first auxiliary support table 30 is improved.

As illustrated in FIGS. 3 and 4, the second cross beam member 34 is stretched between the pair of leg portions 32 extending in the cooler axis direction and disposed in parallel with a gap therebetween in the cooler axis direction. The second cross beam member 34 of this embodiment is formed of, for example, channel steel.

Further, as illustrated in FIG. 3, the reinforcement member 35 extends in the inclined direction so as to connect the base plate 31 and the leg portion 32 to each other, and is formed of for example, channel steel in this embodiment.

As illustrated in FIGS. 3 to 6B, the first cross beam member 33 includes a cross beam body 331, a longitudinal swing limiting portion (a first swing limiting portion) 332, and a pair of lateral swing limiting portions (second swing limiting portions) 333. The cross beam body 331 extends in the horizontal direction perpendicular to the cooler axis direction at a position below the second cooler 54B, and is stretched between the pair of leg portions 32 disposed with the second cooler 54B interposed therebetween. The cross beam body 331 of this embodiment is formed of, for example, H-shaped steel.

The longitudinal swing limiting portion 332 is a part that protrudes upward from the cross beam body 331. The longitudinal swing limiting portion 332 of this embodiment is formed of, for example, the channel steel that is attached to the upper end of the cross beam body 331. The longitudinal swing limiting portion 332 has a height dimension in which the upper end thereof is located at the upside in relation to the support piece 543 of the second cooler 54B. That is, when the first auxiliary support table 30 is viewed from the front side thereof while the right side of FIG. 5 is set as the front side and the left side thereof is set as the rear side, the longitudinal swing limiting portion 332 has a height dimension in which the upper portion thereof overlaps the lower portion of the support piece 543. Then, the longitudinal swing limiting portion 332 of the front first cross beam member 33 is disposed at the front side of the support piece 543 with a slight gap with respect to the support piece 543 provided at the front portion of the second cooler 54B in the cooler axis direction. Further, the longitudinal swing limiting portion 332 of the rear first cross beam member 33 is disposed at the rear side of the support piece 543 with a slight gap with respect to the support piece 543 provided at the rear portion of the second cooler 54B in the cooler axis direction. That is, as illustrated in FIG. 5, the pair of longitudinal swing limiting portions 332 and 332 is provided so as to interpose the pair of support pieces 543 and 543, provided at a gap therebetween in the cooler axis direction, from the outside of the cooler axis direction.

Since the longitudinal swing limiting portion 332 is provided in this way, the front or rear support piece 543 comes into contact with the corresponding longitudinal swing limiting portion 332 when the second cooler 54B swings forward or backward. Since the forward or backward movement of the second cooler 54B is restricted by the longitudinal swing limiting portion 332, it is possible to prevent the damage of the connection position between the cooler and the pipe.

Furthermore, the specific shape of the longitudinal swing limiting portion 332 is not limited as long as the longitudinal swing limiting portion 332 protrudes upward from the cross beam body 331 so as to come into contact with the support piece 543 of the second cooler 54B. Further, the longitudinal swing limiting portion 332 may be provided so as to protrude toward the second cooler 54B in the leg portion 32.

Figure 7A:
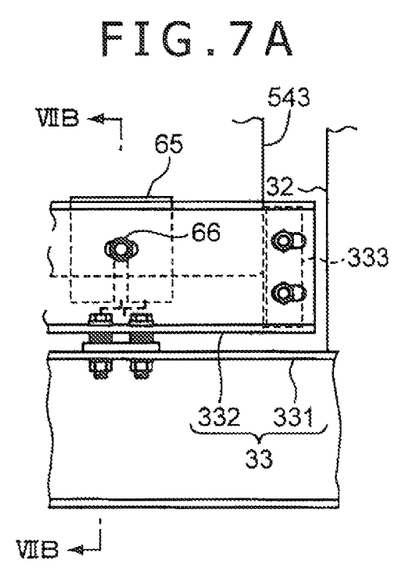
Figure 7B:
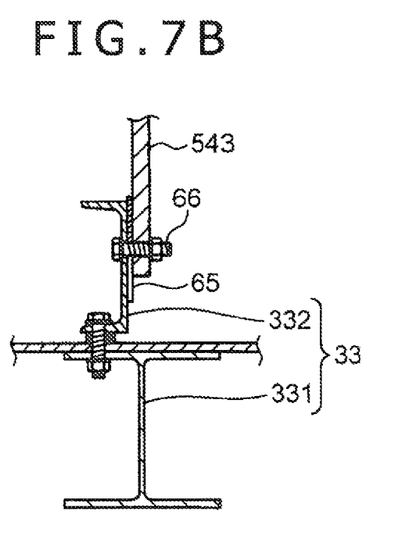

When the first auxiliary support table 30 having the second cooler 54B disposed thereon, that is, the first cooler unit is transported so that the compression apparatus 1 may be assembled in an installation place, the support piece 543 is fixed to the longitudinal swing limiting portion 332 as illustrated in FIGS. 7A and 7B. At this time, the support piece 543 and the longitudinal swing limiting portion 332 are connected to each other by a fastening member 66 in a state where a spacer 65 is interposed between the support piece 543 and the longitudinal swing limiting portion 332. The spacer 65 has a thickness corresponding to the gap between the support piece 543 and the longitudinal swing limiting portion 332. Accordingly, when the front support piece 543 and the rear support piece 543 of the second gas cooler 54B are respectively fixed to the corresponding longitudinal swing limiting portions 332, the second gas cooler 54B may be fixed without any deviation from a predetermined arrangement position. In this way, since the second cooler 54B is fixed to the arrangement position in, the first auxiliary support table 30 when the support piece 543 is fixed to the longitudinal swing limiting portion 332, it is possible to prevent the second cooler 54B from being dropped from the first auxiliary: support table 30 due to the large movement (swing) of the second cooler 54B caused by the vibration or the swing in a transportation state.

In this way, in the compression apparatus 1 of this embodiment, the longitudinal swing limiting portion 332, the spacer 65, and the fastening member 66 constitute a fixation portion that fixes the second cooler 54B suspended on the base plate 31 to the cross beam body 331 during the transportation of the first cooler unit.

As illustrated in FIGS. 4 to 6A and FIG. 7A, the lateral swing limiting portion 333 is a plate-shaped member that is attached to the longitudinal swing limiting portion 332. The lateral swing limiting portion 333 has a height dimension in which the upper end thereof is located at the upside in relation to the lower end of the support piece 543 of the second cooler 54B. Further, the lateral swing limiting portion 333 has a thickness dimension in which the lateral swing limiting portion 333 comes into contact with the support piece 543 when the support piece 543 moves in the lateral direction (the right and left direction of FIG. 4). The pair of lateral swing limiting portions 333 and 333 attached to the front longitudinal swing limiting portion 332 is disposed at both sides of the support piece 543 with a slight gap with respect to the support piece 543 provided at the front portion of the second cooler 54B in the horizontal direction perpendicular to the cooler axis. In the same way, the pair of lateral swing limiting portions 333 and 333 attached to the rear longitudinal swing limiting portion 332 is disposed at both sides of the support piece 543 with a slight gap with respect to the support piece 543 provided at the rear portion of the second cooler 54B in the horizontal direction perpendicular to the cooler axis. That is, in the longitudinal swing limiting portions 332, the pair of longitudinal swing limiting portions 333 and 333 is disposed so as to interpose the support piece 543 from the outside in the horizontal direction perpendicular to the cooler axis.

Since the lateral swing limiting portion 333 is provided in this way, the support piece 543 comes into contact with the corresponding lateral swing limiting portion 333 when the second cooler 54B swings in the lateral direction. Accordingly, since the lateral movement of the second cooler 54B is restricted by the lateral swing limiting portion 333, it is possible to prevent the damage of the connection position between the cooler and the pipe.

The first auxiliary support table 30 with the above-described configuration is connected to the main support base 20 in a manner such that the end of the base plate 31 and the end of the main body base plate 21 are separably connected to each other by a fastening member such as a bolt.

Figure 6A:
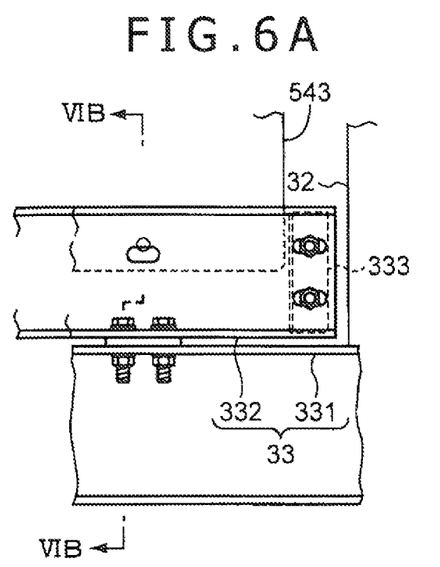
Figure 6B:
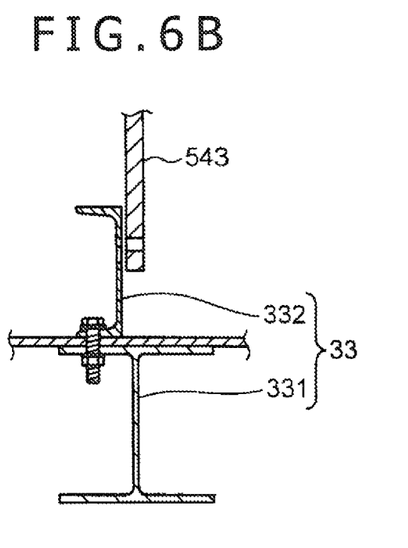

As illustrated in FIG. 1, the second auxiliary support table 40 has substantially the same configuration as that of the first auxiliary support table 30. That is, the second auxiliary support table 40 includes the base plate 31, the plurality of leg portions 32, the first cooler support portion 36, and the second cooler support portion (the suspending portion) 37. Further, even in the second auxiliary support table 40, the first cross beam member (the cross beam member) 33 that includes the cross beam body 331, the longitudinal swing limiting portion 332, and the lateral swing limiting portion 333 having a configuration of FIG. 6 and the second cross beam member 34 are attached to the lower portion of the leg portion 32, and the reinforcement member is attached to the upper portion of the leg portion 32. Furthermore, in the second auxiliary support table 40, the same reference numerals will be given to the same components as those of the first auxiliary support table 30, and the detailed description thereof will not be repeated.

In the second auxiliary support table 40, the sixth cooler 54F is placed on the base plate 31, and the fourth and fifth coolers 54D and 54E are disposed below the base plate 31. The sixth cooler 54F is supported on the base plate 31 of the second auxiliary support table 40 by the first cooler support portion 36. Further, the fourth cooler 54D and the fifth cooler 54E are respectively suspended on the base plate 31 of the second auxiliary support table 40 by the second cooler support portion 37.

In the fourth and fifth coolers 54D and 54E, the support piece 543 is bonded to the upper side of the cooler body 540. Further, in the fourth and fifth coolers 54D and 54E, a plate-shaped contact piece 545 that extends downward from the cooler body 540 and is widened in a direction perpendicular to the cooler axis is bonded to a position located below the cooler body 540 and corresponding to each longitudinal swing limiting portion 332. As in the case of the support piece 543 of the second cooler 54B, the contact piece 545 has a configuration in which the front or rear contact piece 545 comes into contact with the corresponding longitudinal swing limiting portion 332 so as to restrict the further movement of the fourth and fifth coolers 54D and 54E when the fourth and fifth coolers 54D and 54E swing forward or backward.

Furthermore, in the second auxiliary support table 40, since two coolers (the fourth cooler 54D and the fifth cooler 54E) are disposed below the base plate 31, two longitudinal swing limiting portions 332 are provided at the positions corresponding to the coolers 54D and 54E of each cross beam body 331.

According to the above-described compression apparatus 1, in the first or second auxiliary support table 30 or 40, the plurality of leg portions 32 are disposed at both sides of the arrangement position of the second cooler 54B or the fourth and fifth coolers 54D and 54E so as to interpose the arrangement position in the horizontal direction, so that the first and second auxiliary support tables 30 and 40 may stand by itself. For this reason, there is no need to support the first and second auxiliary support tables 30 and 40 in the work in which the first and second auxiliary support tables 30 and 40 are connected to the main support base 20. Further, since it is possible to transport the first and second auxiliary support tables 30 and 40 having the second cooler 54B or the fourth and fifth coolers 54D and 54E attached thereto, that is, the first and second cooler units, the second cooler 54B or the fourth and fifth coolers 54D and 54E may be moved to the installation place while being disposed on the first and second auxiliary support tables 30 and 40 in a factory or the like, and the first and second cooler units may be directly connected to the main support base 20 and the compressor 52, that is, the main body of the compression apparatus 1. As a result, the assembling workability of the compression apparatus 1 is improved.

In the first and second auxiliary support tables 30 and 40, the first cooler support portion 36 and the second cooler support portion 37 support the first, second, and fourth to sixth coolers 54A, 54B, and 54D to 54F so as to allow the movement from the arrangement position thereof caused by the thermal expansion of the pipe connecting the first, second, and fourth to sixth coolers 54A, 54B, and 54D to 54F to the compressor 52. For this reason, when the pipe or the like is thermally expanded by the high-temperature gas discharged from the compressor 52, the coolers 54A, 54B, 54D to 54F move from the arrangement position thereof, so that the stress caused by the thermal expansion may be suppressed.

Furthermore, the compression apparatus and the cooler unit of the present invention are not limited to the above-described embodiment, and may be, of course, modified into various forms without departing from the spirit of the present invention.

The number of the auxiliary support tables disposed on the support base 10 may be one or three or more.

Figure 8:
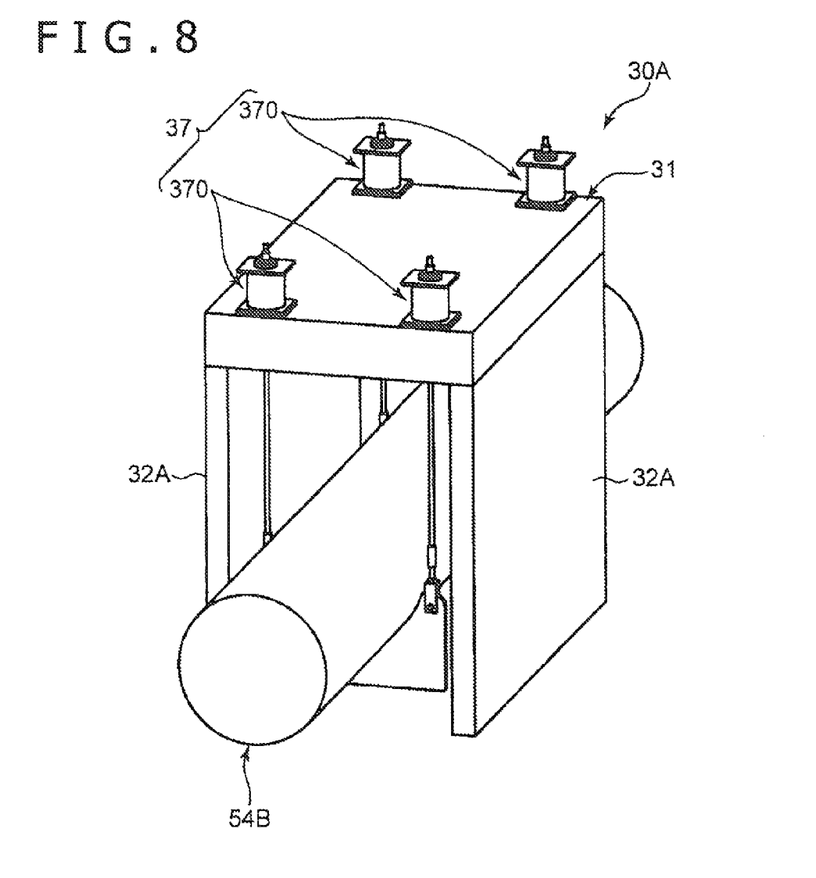
FIG. 8 is a schematic perspective view of the auxiliary support table according to the embodiment.

As illustrated in FIG. 8, the leg portion 32A of the auxiliary support table 30A may have, for example, a plate shape or the like other than the shape extending in the up and down direction.

Figure 9:
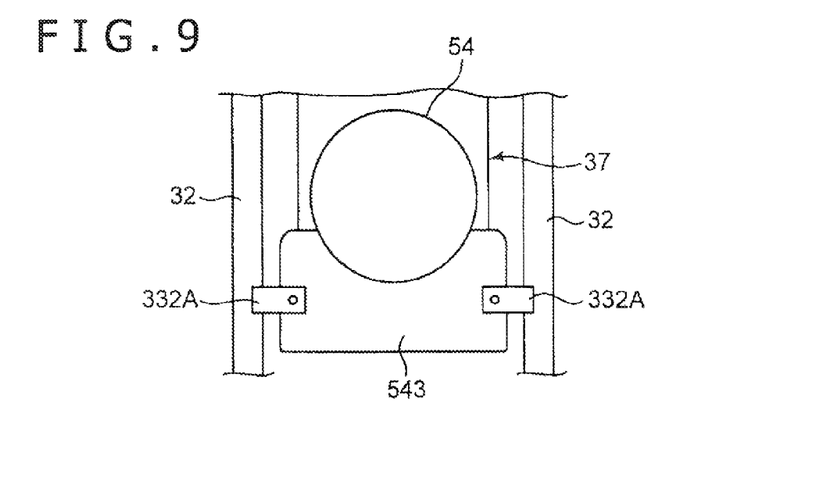
FIG. 9 is a view illustrating a longitudinal swing limiting portion according to the embodiment.

The longitudinal swing limiting portion 332 of the above-described embodiment is provided so as to protrude upward from the first cross beam member 331, but is not limited to this configuration. For example, as illustrated in FIG. 9, the longitudinal swing limiting portion 332A may protrude in the horizontal direction from the height position corresponding to the support piece 543 of the cooler 54 in the leg portion 32.

Further, in the first and second auxiliary support tables 30 and 40, the second, fourth, and fifth coolers 54B, 54D, and 54E disposed below the base plate 31 may be supported by the first cooler support portion 36 on the first cross beam member 331 or the like.

In the first and second auxiliary support tables 30 and 40, the first cross beam member 33, the second cross beam member 34, and the reinforcement member 35 may not be essentially provided as long as strength is ensured. Further, the first and second auxiliary support tables 30 and 40 may be provided with one or two members among three members, that is, the first cross beam member 33, the second cross beam member 34, and the reinforcement member 35.

What is claimed is:

1. A compression apparatus comprising:
   a compressor that compresses a gas;
   a cooler that cools the gas discharged from the compressor in a compressed state; and
   a support base that supports the compressor and the cooler,
   wherein the support base includes a main support base having the compressor disposed on the main support base and an auxiliary support table connectable to the main support base,
   wherein the auxiliary support table includes a base plate supporting the cooler and a plurality of leg portions supporting the base plate such that the auxiliary support table is supported by the plurality of leg portions, and
   wherein the cooler is suspended below the base plate of the auxiliary support table and the cooler extends in between at least two of the plurality of leg portions, the cooler being disposed entirely underneath a plane formed by an uppermost surface of the base plate of the auxiliary support table.

2. The compression apparatus according to claim 1, wherein the plurality of leg portions are disposed so that at least two leg portions are located on both sides of the cooler with a gap interposed between the at least two leg portions.

3. The compression apparatus according to claim 1, wherein the auxiliary support table includes a suspending portion that suspends the cooler below the base plate, and
   wherein the suspending portion includes a variation allowing portion that allows the movement of the cooler with an expansion of a pipe connecting the compressor and the cooler to each other.

4. The compression apparatus according to claim 3, wherein the auxiliary support table further includes a cross beam member that is stretched between the leg portions below the cooler, and
   wherein the cross beam member includes a first swing limiting portion that restricts the movement of the cooler in a direction intersecting the cross beam member.

5. The compression apparatus according to claim 4,
wherein the cross beam member includes a second swing limiting portion that restricts the movement of the cooler in a direction along the cross beam member.

6. A cooler unit that includes a compressor compressing a gas and a main support base having the compressor disposed on the main support base and is connectable to a compression apparatus body, the cooler unit comprising:
a cooler that cools the gas discharged from the compressor in a compressed state; and
an auxiliary support table that supports the cooler and is connectable to the main support base,
wherein the auxiliary support table includes a base plate, a plurality of leg portions that support the base plate, a suspending portion that suspends the cooler below the base plate, a cross beam member that extends between the leg portions below the cooler, and a fixation portion that fixes the cooler suspended on the suspending portion to the cross beam member,
wherein the auxiliary support table is supported by the plurality of leg portions, and
wherein the cooler is suspended below the base plate of the auxiliary support table and the cooler extends in between at least two of the plurality of leg portions, the cooler being disposed entirely underneath a plane formed by an uppermost surface of the base plate of the auxiliary support table.

7. The cooler unit according to claim 6,
wherein the fixation portion is adapted to release a fixed state of the cooler and serves as a swing limiting portion that restricts the movement of the cooler in a direction intersecting the cross beam member in a released state.

* * * * *